US009378641B2

(12) United States Patent
Beumler (10) Patent No.: US 9,378,641 B2
(45) Date of Patent: Jun. 28, 2016

(54) DETECTING UNSAFE CAR SEAT PASSENGER-CONDITIONS (71) Applicant: Justin Edward Beumler, Mesa, AZ (US)

(72) Inventor: Justin Edward Beumler, Mesa, AZ (US)

(*) Notice: Subject to any disclaimer, the term of this patent is extended or adjusted under 35 U.S.C. 154(b) by 0 days.

(21) Appl. No.: 14/308,170

(22) Filed: Jun. 18, 2014

(65) Prior Publication Data

US 2014/0306838 A1 Oct. 16, 2014

(51) Int. Cl.
B60Q 1/00 (2006.01)
G08G 1/123 (2006.01)
B60N 2/28 (2006.01)
B60N 2/00 (2006.01)
G08B 21/22 (2006.01)

(52) U.S. Cl.
CPC ............... *G08G 1/123* (2013.01); *B60N 2/002* (2013.01); *B60N 2/28* (2013.01); *G08B 21/22* (2013.01); *B60N 2002/2815* (2013.01)

(58) Field of Classification Search
CPC ...... G08B 21/0202; G08B 21/22; B60N 2/26; B60N 2/002; B60N 2/28; B60N 2002/2815; B60Q 9/001; B60Q 9/00; G08G 1/123
USPC ............ 340/457, 573.1, 573.4, 666, 667, 340/539.11, 539.21, 539.23, 425.5, 522; 180/268, 271, 273
See application file for complete search history.

(56) References Cited

U.S. PATENT DOCUMENTS

| 6,104,293 | A  | * | 8/2000  | Rossi ......................... 340/573.1 |
| 6,581,960 | B1 |   | 6/2003  | Schondorf et al. |
| 6,922,147 | B1 | * | 7/2005  | Viksnins et al. ........... 340/573.1 |
| 6,922,622 | B2 |   | 7/2005  | Dulin et al. |
| 7,378,979 | B2 |   | 5/2008  | Rams, Jr. |
| 7,786,852 | B2 |   | 8/2010  | Kautz |
| 8,284,041 | B2 |   | 10/2012 | Cuddihy et al. |
| 8,405,725 | B2 |   | 3/2013  | McMahon et al. |
| 2003/0122662 | A1 |   | 7/2003 | Quinonez |
| 2004/0009729 | A1 | * | 1/2004 | Hill ........................ D02G 3/441 442/208 |
| 2005/0156725 | A1 |   | 7/2005 | Muhammad |
| 2006/0082459 | A1 |   | 4/2006 | Alvarez |
| 2006/0103516 | A1 | * | 5/2006 | Zang ............................ 340/457 |
| 2007/0132571 | A1 | * | 6/2007 | Rossi ..................... B60N 2/002 340/457 |
| 2008/0119989 | A1 |   | 5/2008 | Henning et al. |
| 2008/0125941 | A1 |   | 5/2008 | Mitteer |
| 2011/0267186 | A1 |   | 11/2011 | Rao |
| 2012/0232749 | A1 | * | 9/2012 | Schoenberg et al. ........... 701/36 |
| 2012/0256769 | A1 |   | 10/2012 | Satpathy |

(Continued)

OTHER PUBLICATIONS

"Look Before You Lock", HHS HealthBeat, Aug. 16, 2012, 1 page, accessed online at http://hhs.gov/news/healthbeat/2012/08/20120816a.html.

(Continued)

*Primary Examiner* — Anh V La
(74) *Attorney, Agent, or Firm* — Faegre Baker Daniels LLP (57) ABSTRACT In some aspects, a portable car-seat assembly for installation in a vehicle includes a temperature sensor that detects an ambient temperature inside the vehicle. The portable car-seat assembly also includes a location detector that detects a location of the car-seat assembly. The car-seat assembly is configured to initiate a predetermined action in response to detecting an unsafe passenger-condition based on the temperature. For example, a message indicating the temperature and the location of the car-seat assembly can be sent to a remote recipient.

20 Claims, 4 Drawing Sheets (56) References Cited

U.S. PATENT DOCUMENTS

| | | |
|---|---|---|
| 2012/0268265 A1 | 10/2012 | Morley et al. |
| 2013/0033373 A1 | 2/2013 | Thomas |
| 2013/0049955 A1 | 2/2013 | Hoover et al. |
| 2013/0218487 A1 | 8/2013 | Fujii et al. |
| 2013/0226369 A1 | 8/2013 | Yorio et al. |
| 2014/0167955 A1* | 6/2014 | Mahajan ............ G08B 21/0269 340/539.12 |

OTHER PUBLICATIONS

"Startup Lumos Brings Wearable Solar Chargers—Plug into the Sun!", NextBigWhat, Jan. 30, 2013, 4 pages. http://www.nextbigwhat.com/lumos-solar-chargers-297/.

"Sliver Cells on the Wearable Solar Power Horizon", Talk2MyShirt, Aug. 18, 2011, 3 pages, accessed online at http://www.talk2myshirt.com/blog/archives/5411.

Halsey III, Ashley, "Forgotten-Baby Devices Don't Always Work", Jul. 30, 2012, 2 pages, accessed online at http://www.washingtonpost.com/local/trafficandcommuting/forgotten-baby-devices-dont-always-work/2012/07/30/gJQAQwOiKX_story.html.

Jaslow, Ryan, "Gov't Study: Devices that Alert Parents they Left a Child in Car Deemed Unreliable", Jul. 31, 2012, 4 pages, accessed online at http://www.cbsnews.com/news/govt-study-devices-that-alert-parents-they-left-a-child-in-car-deemed-unreliable/.

"ChildMinder® SoftClip® System* -CM-111", 2 pages, accessed online on May 6, 2014 at http://www.babyalert.info/childminder-softclip-system.html.

"ChildMinder® Systems", 2 pages, accessed online on May 6, 2014 at http://babyalert.info/baby-alert-products/childminder-systems.html.

"Amazon.com: The First Years True Fit IAlert C685 Car Seat", 8 pages, accessed online on May 6, 2014 at http://www.amazon.com/The-First-Years-IAlert-Naturalization/dp/B00A8EZPWG.

Turner and McCoy, "Child Car Seat Alarm Systems Alert You When Child is Left in Car", Aug. 23, 2012, 2 pages, accessed online at http://mykisscountry937.com/child-car-seat-alarm-systems-alert-you-when-child-is-left-in-hot-car/.

Suddenly Safe 'N' Secure Systems, Inc., "Toddler Wristband Safe 'N' Secure Alarm System", 1 page, accessed online on May 6, 2014 at http://shop.suddenlysafensecuresystems.com/Toddler-Wristband-Safe-N-Secure-Alarm-System-A-410.htm.

"The Forget Me Not Alarm is a Lifesaver", 2 pages, accessed online on May 6, 2014 at http://mtcbiz.net/forget_me_not_alarm.html.

Texas Instruments Wiki, "SafeBABI", version last modified on Sep. 27, 2010, 5 pages, accessed online at http://processors.wiki.ti.com/index.php/SafeBABI.

Sisters of Intervention, "The Halo Baby Seat Safety System", 2 pages, accessed online on May 6, 2014 at http://www.sistersofintervention.com/child_products_readch.html.

Article by Paul Stenquist, How to Remind a Parent of the Baby in the Car? http://www.nytimes.com/2010/05/30/automobiles/30HEAT.html?pagewanted=all&_r=0 ; Published: May 28, 2010 in the NY Times, retrieved from the internet on May 1, 2014; 4 pages.

Bradley et al., System to Monitor Presence of a Body in an Automobile Seat:, U.S. Appl. No. 14/223,475, filed Mar. 24, 2014, 33 pages.

MTC Products Marketplace, Forget Me Not Car Seat Alarm for the security of your child and personal possessions, http://mtcbiznet/forget_me_not_alarm.html ; retrieved from the internet on May 1, 2014, 2 pages.

"Evenflo Advanced Embrace DLX Infant Car Seat with SensorSafe, Peridot", Walmart, Published on or before Jul. 23, 2015, [retrieved from internet on Aug. 12, 2015], http://www.walmart.com/ip/Evenflo-Advanced-Embrace-DLX-with-SensorSafe-Peridot/45074201#Item+Description.

* cited by examiner

DETECTING UNSAFE CAR SEAT PASSENGER-CONDITIONS

BACKGROUND

The following description relates to detecting unsafe passenger-conditions in a vehicle.

The temperature inside a vehicle can change rapidly, for example, when the vehicle is closed and subject to hot or cold exterior temperatures. The U.S. Department of Health and Human Services has warned that temperatures inside a closed vehicle can rise to life-threatening levels within 10 minutes. Consequently, parents are often warned that it is extremely dangerous to leave a child unattended in a vehicle for even a short amount of time.

SUMMARY

In a general aspect, a vehicle seat assembly can detect an unsafe passenger-condition in a vehicle and initiate a predetermined action in response to detecting the unsafe passenger-condition. In some instances, the vehicle seat assembly is a portable car-seat assembly (e.g., a child booster seat, an infant car seat, etc.).

In some aspects, the temperature inside a vehicle is monitored, and an occurrence of an unsafe passenger-condition is detected based on the temperature inside the vehicle. In response to detecting the occurrence of the unsafe passenger-condition, a message indicating the location of the vehicle is transmitted to a remote recipient.

In some aspects, a portable car-seat assembly includes a temperature sensor adapted to detect an ambient temperature about the car-seat assembly, a location detector adapted to detect a location of the car-seat assembly, and data-processing apparatus. The data-processing apparatus is adapted to detect an occurrence of an unsafe passenger-condition based on the ambient temperature detected by the temperature sensor. The data-processing apparatus is adapted to initiate transmission of a message to a remote recipient in response to detecting the occurrence of the unsafe passenger-condition. The message indicates the location detected by the location detector.

The details of one or more implementations are set forth in the accompanying drawings and the description below. Other features, objects, and advantages will be apparent from the description and drawings, and from the claims.

DETAILED DESCRIPTION

In some aspects of what is described here, a vehicle seat assembly includes safety features that can notify parents, caretakers, nearby persons, or emergency first-responders when a child has been left in a vehicle at unsafe temperatures. The notification can indicate the location of the vehicle and other information that allows the message recipient to find the vehicle and remove the child from danger as quickly as possible. The notification can be, for example, a text message that is sent over a cellular network, and the text message can include a physical address, location name, or GPS coordinates indicating the location of the vehicle. In some cases, the notification is displayed through a smartphone application that allows the message recipient to initiate in-vehicle remedial actions or emergency notifications from the smartphone. In some cases, other action such as starting the car, starting temperature conditioning, or changing window position, etc., may be provided in addition to or in place of a notification.

Figure 1A:
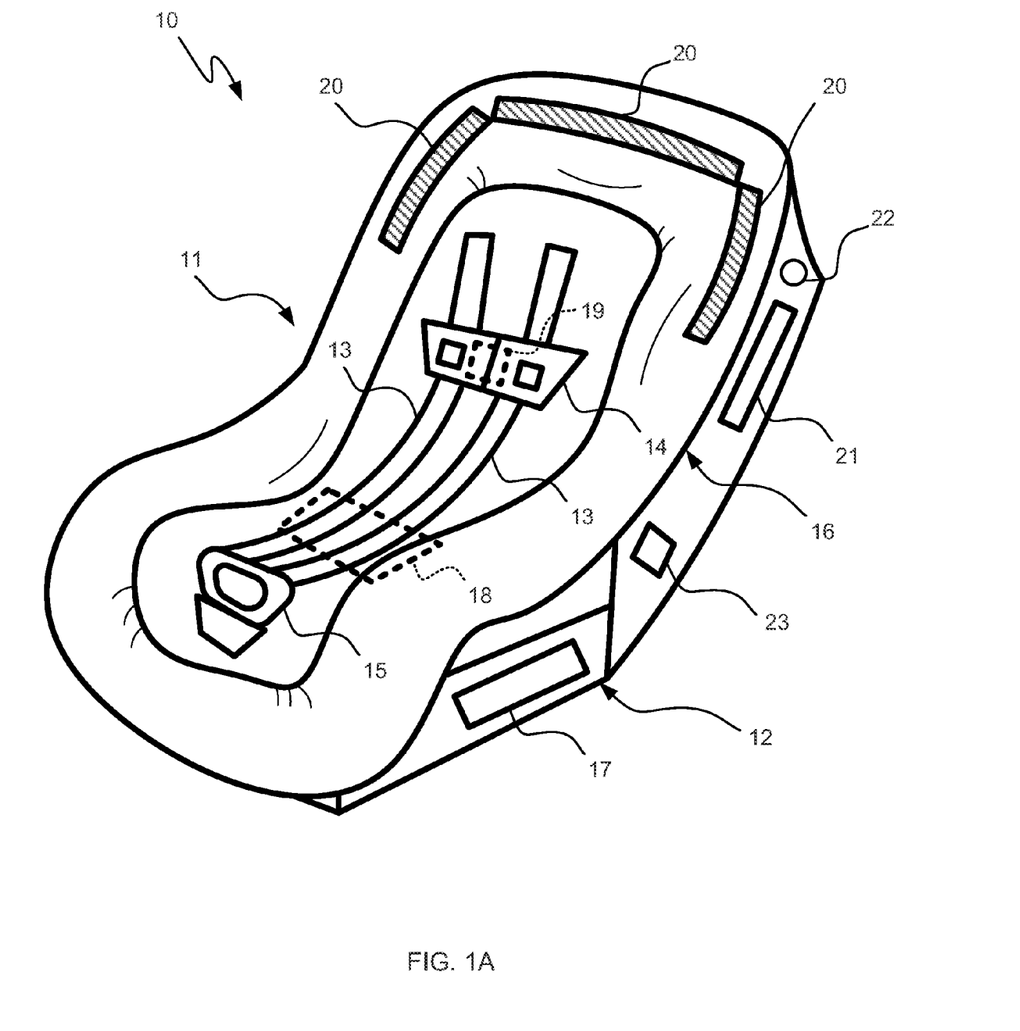
FIG. 1A is a drawing of an example portable car-seat assembly.

FIG. 1A is a drawing of an example portable car-seat assembly 10 designed for installation in a vehicle. The portable car-seat assembly 10 is designed to safely support and secure a child in a passenger vehicle (e.g., a car, van, or truck). For example, the portable car-seat assembly can be installed in the backseat of the car by a parent or caretaker. The portable car-seat assembly 10 can be, for example, a booster seat for a small child or toddler, an infant car seat, or another type of portable car-seat assembly.

In some cases, the example portable car-seat assembly 10 is installed in a vehicle by securing the portable car-seat assembly 10 to the vehicle's built-in passenger seat using the vehicle's built-in seatbelt. In some cases, the portable car-seat assembly 10 is installed in a vehicle (e.g., on a built-in passenger seat or elsewhere) by securing the portable car-seat assembly 10 to anchors that are built into the vehicle interior. The portable car-seat assembly 10 can be installed in a vehicle in another manner, for example, using a combination of these and other types of hardware. After it has been installed in a vehicle, the example portable car-seat assembly 10 can be removed from the vehicle, for example, by releasing the seatbelts or anchor latches that are used to secure the car-seat assembly 10 in the vehicle.

The example portable car-seat assembly 10 includes a seat 11 that is covered by a fabric cover 16. The seat 11 is sized and shaped to support a single passenger in a seated position. For example, the seat 11 can be configured to support a child weighing less than 65 pounds, a child or infant weighing less than 35 pounds, or a passenger of another size. The cover 16 includes padding and shaped supports that can support the passenger and provide added comfort. The cover 16 may include a head or neck support, other components that provide support or impact protection, apertures that allow the safety belts 13 to extend through the cover 16, and other features.

The example cover 16 shown in FIG. 1A includes solar receivers 20. The solar receivers 20 are positioned to receive sunlight (e.g., through the vehicle's windows), and configured to convert solar energy to electrical energy. In some cases, the solar receivers 20 provide primary power to one or more of the other components of the portable car-seat assembly 10. In some cases, the solar receivers 20 provide secondary power, for example by charging a battery carried in a housing 12. In some implementations, the solar receivers 20 are woven into the fabric of the cover 16 and can flex or bend with the fabric. In some implementations, the solar receivers 20 are rigid, and they may be positioned on the housing 12 or in another location on the portable car-seat assembly 10. In other implementations, the solar receivers 20 are omitted, and portable car-seat assembly 10 receives external power (e.g., from a 12-Volt outlet or other plug-in to a vehicle's battery system or power grid, etc.).

The example portable car-seat assembly 10 includes safety belts 13 that can secure a passenger in the seat 11. The safety belts 13 are threaded through two respective sides of the latch 14 and the buckle 15, and the ends of the safety belts 13 are secured to the housing 12 of the portable car-seat assembly 10. The example latch 14 shown in FIG. 1A can be positioned about the passenger's chest, and the example buckle 15 shown in FIG. 1A can be positioned between the passenger's legs. The respective sides of the latch 14 and the buckle 15 can be interlocked to secure the passenger in the seat 11, and the respective sides of the latch 14 and the buckle 15 can be released to allow the passenger to exit the seat 11.

The cover 16, the safety belts 13, and other components of the portable car-seat assembly 10 can include actuators or adjustable mechanisms that allow the car-seat assembly 10 to be adjusted for the size (e.g., height, weight) or preferences of a particular passenger. For example, the links of the safety belts 13 can be lengthened or shortened, the position of the buckle 15 can be moved forward or backward, and the position of the latch 14 can be moved up or down the safety belts 13. In some cases, the housing 12 can be adjusted to change the reclining angle of the seat 11. The portable car-seat assembly 10 may include other types of actuators or adjustable mechanisms.

In the example shown in FIG. 1A, the latch 14 includes a latch sensor 19. The latch sensor 19 detects whether the latch 14 is fastened (i.e., the two sides of the latch 14 are interlocked) or unfastened (i.e., the two sides of the latch 14 are not interlocked). In an example implementation, the latch sensor 19 includes conductive contacts on each side of the latch 14, and the latch sensor 19 detects that the latch 14 is fastened based on current across the conductive contacts. The latch sensor 19 may operate in another manner.

Also in the example shown in FIG. 1A, the seat 11 includes a pressure sensor 18. The pressure sensor 18 detects whether a passenger is present in the seat 11. The example pressure sensor 18 detects the presence of a passenger based on the weight of the passenger bearing on a surface of the seat 11. For example, the pressure sensor 18 can be positioned at the base of the seat 11 beneath the passenger's legs or hindquarters. In an example implementation, the pressure sensor 18 includes a four-inch by six-inch pressure plate, and the pressure sensor 18 is activated by a 21-pound or greater load on the pressure plate. In some cases, the pressure sensor 18 is configured in a different manner, for example, having a different size pressure plate, responding to another size load, etc. The weight that is necessary to activate the pressure sensor 18 may depend, for example, on the type of passenger the seat is designed for. For example, an infant car set may be activated by a 2-pound or greater load. In some cases, weight that is necessary to activate the pressure sensor 18 can be adjusted by a user.

The pressure sensor 18 and the latch sensor 19 are examples of passenger-status sensors in the portable car-seat assembly 10. For example, the pressure sensor 18 and the latch sensor 19 can generate outputs that indicate the status of a passenger in the seat 11. For example, the passenger-status information can indicate that a passenger is seated and latched in the seat 11, or the passenger-status information can indicate that a passenger is seated but not latched in the seat 11.

The pressure sensor 18 and the latch sensor 19 can independently send passenger-status information or other sensor data to another component of the portable car-seat assembly 10 or to an external receiver. For example, the pressure sensor 18 and the latch sensor 19 may be connected (e.g., by a wired or wireless link) to a data-processing apparatus included in the portable car-seat assembly 10, or they may be wirelessly linked (e.g., by a radio-frequency signal) to a paired external device (i.e., external to the portable car-seat assembly 10). In some cases, the latch sensor 19 produces an output voltage or other signal that indicates the status of the latch 14, the pressure sensor 18 produces an output voltage or other signal that indicates the presence of a passenger in the seat 11, and a processor can monitor the passenger-status based on the output voltages or other signals.

The example housing 12 of the car-seat assembly 10 includes a user interface 17, a horn 23, a temperature sensor 22, and a strobe 21. In some cases, the user interface 17, the horn 23, the temperature sensor 22, or the strobe 21 (or any combination of these) are included on both sides of the housing 12. As such, the user interface 17 may be accessible to a parent or caretaker regardless of whether the portable car-seat assembly 10 is installed on a passenger or driver side of the vehicle. Similarly, horns and strobes may be positioned on both sides of the car-seat assembly 10, so that they generate alerts that are audible and visible outside the vehicle regardless of whether the portable car-seat assembly 10 is installed on a passenger or driver side of the vehicle.

Figure 2:
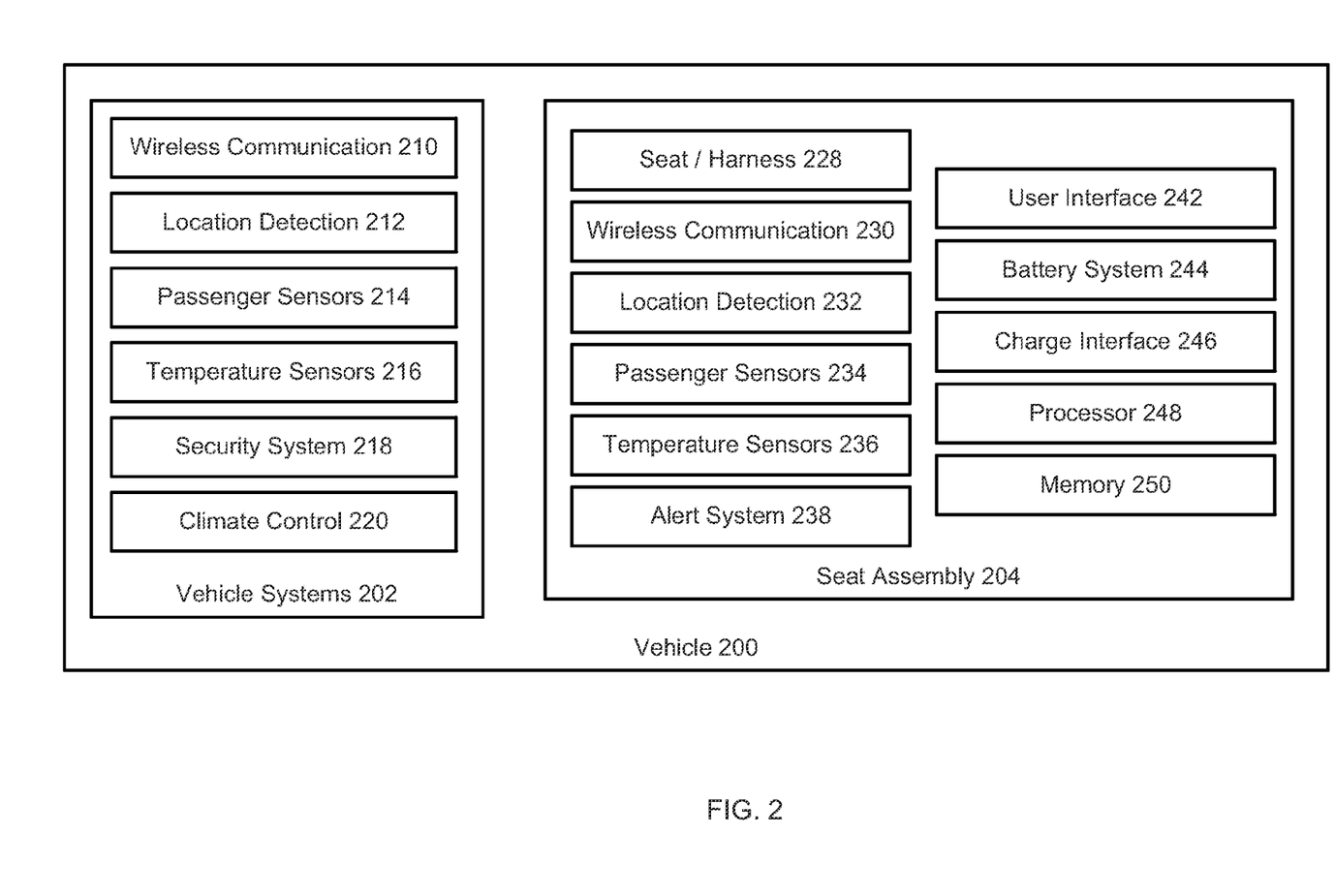
FIG. 2 is a schematic diagram of an example vehicle that includes a seat assembly.

Inside the housing 12 (e.g., beneath the seat 11), the example car-seat assembly 10 also includes a power system, a processor, a location detector, and a communication system, examples of which are shown in FIG. 2. In some cases, the housing 12 includes a base portion that is designed for installation in a vehicle, and the seat 11 is included in a releasable carrier portion that releases from the base portion. In some cases, the housing 12 is assembled to the seat 11, and the seat 11 is not designed to release from the housing 12.

The power system includes a battery or another power source that provides electrical energy to the power-consuming components of the car-seat assembly 10. For example, the battery can provide a direct-current (DC) voltage to one or more voltage buses that are connected to the processor, the strobe 21, the horn 23, the user interface 17, the latch sensor 19, the pressure sensor 18, the location detector, the processor, the communication system, or a combination of these. The battery can be a rechargeable battery that receives charge from the solar receivers 20 or another type of charge interface. For example, the car-seat assembly 10 may include a charge interface that connects to a wall outlet (e.g., a 120 Volt outlet, or an outlet of another voltage), an in-vehicle power outlet, or another power source.

The temperature sensor 22 can detect an ambient temperature about the car-seat assembly 10. The temperature sensor 22 can send passenger-condition information or other sensor data to another component of the portable car-seat assembly 10 or to an external receiver. For example, the temperature sensor 22 may be connected (e.g., by a wired link, a wireless link, or both) to a data-processing apparatus included in the portable car-seat assembly 10, or it may be wirelessly linked (e.g., by a radio-frequency signal) to a paired device external to the portable car-seat assembly 10. In some cases, the temperature sensor 22 produces an output voltage or other signal that indicates the ambient temperature about the car-seat assembly 10, and a processor can monitor the condition based on the output voltages or other signals.

In the example shown in FIG. 1A, a safety-monitoring algorithm executed by the processor included in the portable car-seat assembly 10 monitors the passenger-status information (e.g., provided by the pressure sensor 18 and the latch sensor 19) and the passenger-condition information (e.g., provided by the temperature sensor 22 and possibly other sensors), and compares the monitored information against predetermined safety criteria. For example, the predetermined safety criteria can include a predetermined safe-temperature-criterion, or other types of safety criteria. In some implementations, some or all of the safety-monitoring algorithm can be executed by another device that is external to the portable car-seat assembly 10. For example, the algorithm could be executed by a smartphone or a vehicle system that is connected (by a wired or wireless connection) to the portable car-seat assembly 10.

The safety-monitoring algorithm can be pre-programmed, or it can be programmed based on inputs received through the user interface 17. The predetermined safe-temperature-criterion can be, for example, a range of safe temperatures, a maximum safe temperature, or a minimum safe temperature. In some cases, a user can specify (e.g., through the user interface 17) a maximum safe-temperature threshold (e.g., 85° F.), a minimum safe-temperature threshold (e.g., 45° F.), or both. In some implementations, the user interface 17 displays a current temperature detected by the temperature sensor 22, and one or more safe-temperature thresholds that are used by the safety-monitoring algorithm. In some cases, the portable car-seat assembly 10 does not include a user interface, and the user interface functions are provided through another device, such as, for example, a remote control, the vehicle itself, a smartphone, or another device.

The safety-monitoring algorithm can detect an unsafe passenger-condition, for example, when the monitored information does not meet the predetermined safety criteria. For instance, the safety-monitoring algorithm can determine that an unsafe passenger-condition has occurred when a passenger is detected in the seat 11 and the ambient temperature about the seat 11 is outside (above or below) the predetermined safe-temperature range. Other types of unsafe passenger-conditions may be detected. In some cases, the safety-monitoring algorithm initiates a sequence of actions in response to detecting the unsafe passenger-condition.

In some instances, the safety-monitoring algorithm initiates transmission of a message to a remote recipient in response to detecting the unsafe passenger-condition. For example, the safety-monitoring algorithm may use a communication system included in the portable car-seat assembly 10 to send a text message, a voice message, or another type of message over a cellular voice or data network. The message can be sent to one or more predetermined contacts, to emergency first-responders, or to a combination of these and other types of recipients.

In some cases, the safety-monitoring algorithm detects a location of the portable car-seat assembly 10. For example, the portable car-seat assembly 10 may include a location detection system, such as, for example, a Global Positioning System (GPS) module or another type of location detection system. In some instances, the safety-monitoring algorithm monitors the location periodically. In some instances, the safety-monitoring algorithm monitors the location in response to a detected condition, for example, upon detecting an unsafe passenger-condition.

When an unsafe passenger-condition is detected, the message sent to remote recipients (e.g., parents or guardians, caretakers, emergency first-responders) can include location information from the location detection system included in the portable car-seat assembly 10. The location information can include GPS coordinates (i.e. longitude and latitude), a physical address associated with GPS coordinates, or another type of location indicator (e.g., "home," "day care," etc.). The location information included in the message can allow a remote recipient to locate the vehicle and address the unsafe passenger-condition.

In some instances, the safety-monitoring algorithm may use the horn 23 to generate an audible alert that can be heard outside the vehicle, or the safety-monitoring algorithm may use the strobe 21 to generate a visual alert that can be seen outside the vehicle. In the example shown, the horn 23 has a 1"×1" output component that directs an audible distress signal away from a passenger in the car-seat assembly 10; and the strobe 21 has a 2"×1" output component that directs a visible distress signal away from a passenger in the car-seat assembly 10. Another type or size of alert system can be used. The audible or visual alert can call attention to the vehicle and alert emergency first-responders or others who are trying to locate the vehicle. In some instances, the safety-monitoring algorithm may initiate remedial action within the vehicle, such as, for example, rolling down the vehicle's windows, starting the vehicle's air-conditioner or heater, etc.

These and other types of actions may be initiated by the safety-monitoring algorithm in response to a variety of circumstances. For example, the safety-monitoring algorithm may initiate audible and visible alerts or in-vehicle remedial action immediately upon detection of the unsafe passenger-condition, after the unsafe passenger-condition has persisted for a predetermined amount of time (e.g., two minutes, five minutes, etc.), or upon receiving a command for a remote system. For example, a message recipient who is notified of the unsafe passenger-condition may initiate audible and visible alerts from a smartphone or other device.

The message sent to remote recipients or to emergency first-responders is configured to notify the recipient of the unsafe passenger-condition. In some cases, the message is a text message that is sent to one or more cellular phone numbers. In some cases, the message is a voice message that is sent to one or more phone numbers. In some cases, the message is formatted for display by a particular mobile device application. For example, the parents, guardians, or caretakers who use the portable car-seat assembly 10 can install a software application on their smartphones, and the message generated by the car-seat assembly 10 (or information derived from the message) can be presented to them through the software application.

Figure 1B:
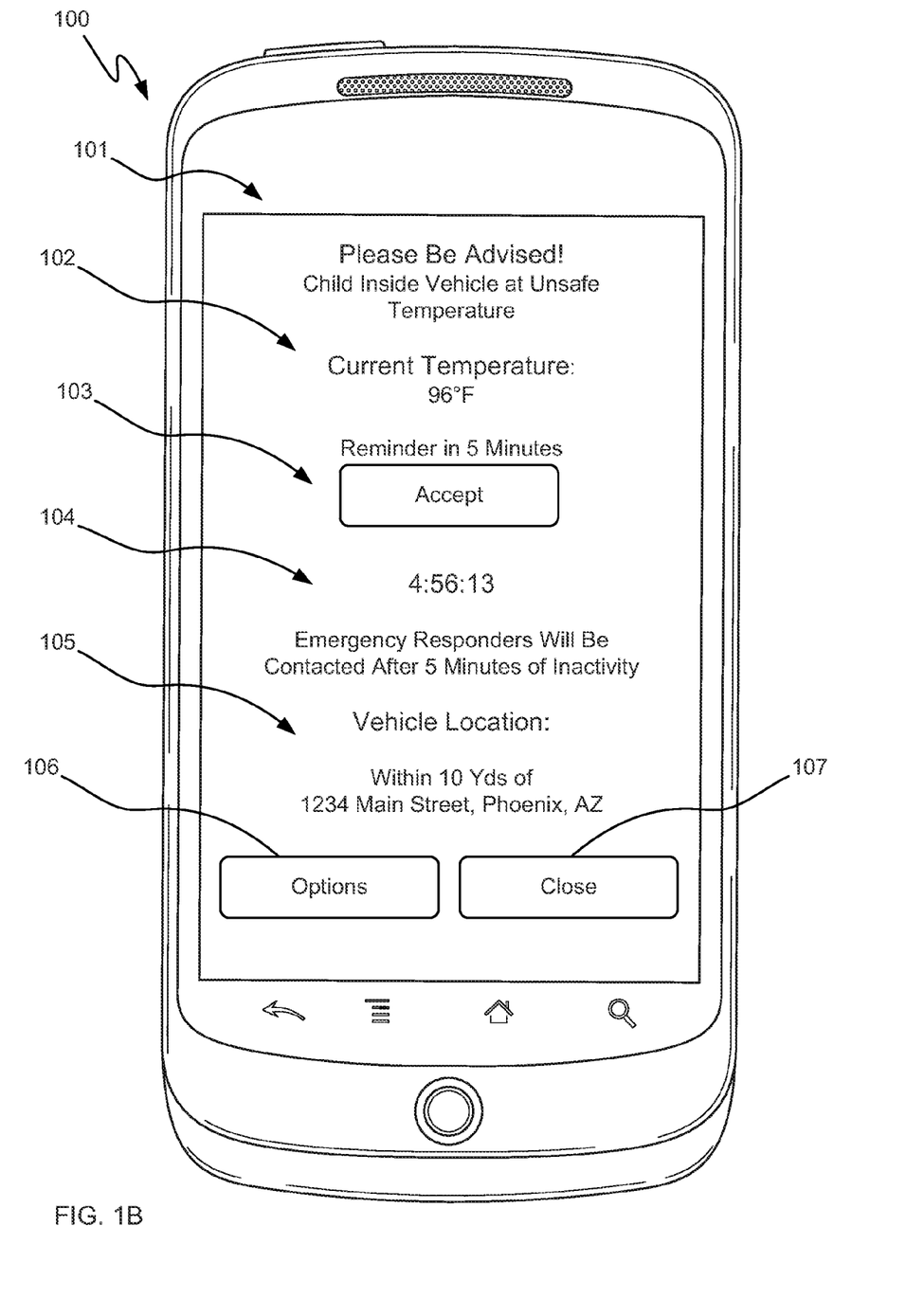
FIG. 1B is a drawing of an example notification displayed on a smartphone device.

FIG. 1B is a drawing of an example notification 101 displayed on a smartphone device 100. The notification 101 can be generated by the smartphone device 100 based on a message or other information generated by the portable car-seat assembly 10 shown in FIG. 1A. The message or other information used to generate the notification 101 can be delivered to the smartphone device 100 over a wireless communication link, such as, for example, a cellular voice or data network, a Wi-Fi network, a local area network, the Internet, a Bluetooth connection, or another type of communication link.

In some cases, the notification 101 is generated by a custom smartphone application that interfaces with the portable car-seat assembly 10. The smartphone application can be downloaded and installed on the parent or caretaker's smartphone, for example, when the portable car-seat assembly 10 is purchased or registered (or at another time). In some implementations, the smart phone application can be used to program the portable car-seat assembly 10. For example, the safe-temperature range, the contact information for sending unsafe passenger-condition notifications, and possibly other settings can be programmed through the smartphone application, etc.

As shown in FIG. 1B, the example notification 101 includes temperature information 102, a response interface 103, a timer display 104, location information 105, an options button 106, and a close button 107. A notification can include additional or different information, and the information in the notification can be arranged and formatted in another manner. Moreover, the notification can be displayed on another type of device (e.g., a tablet, a monitor, a television, etc.), or the notification can be produced in audible or printed format.

The top portion of the notification 101 advises the smartphone user that a child is inside a vehicle at an unsafe temperature. The temperature information 102 advises the smartphone user of the current temperature inside the vehicle where the unsafe passenger-condition was detected. For example, the current temperature (96° F.) can be the temperature detected by the temperature sensor 22 included in the portable car-seat assembly 10. The response interface 103 allows the smartphone user to request a reminder after certain period of time. In the example shown, by selecting the "accept" button, the smartphone user will receive a reminder after five minutes.

The timer display 104 indicates to the smartphone user the amount of time until a subsequent action will be taken. The timer display 104 may also indicate other time information, such as, for example, the amount of time that has elapsed since the unsafe passenger-condition was detected. In the example shown, the timer display 104 indicates that emergency responders will be contacted after five minutes of inactivity, and that there are 4 minutes, 56 seconds remaining in the five-minute period.

The location information 105 indicates to the smartphone user the location of the vehicle where the unsafe passenger-condition was detected. For example, the vehicle location ("within 10 yards of 1234 Main St., Phoenix, Ariz.") can be the location detected by the location detector included in the portable car-seat assembly 10. In some instances, the location information 105 may indicate the location in another form or format. For example, the location information may be displayed as GPS coordinates, or the name of the location (e.g., "home").

The options button 106 can be selected by the user to see other options. For example, selecting the options button 106 may allow the user to initiate in-vehicle remedial actions (e.g., rolling down the vehicle's windows, starting the vehicle's air-conditioner or heater, etc.). As another example, the options button 106 may allow the user to immediately notify emergency first-responders, to immediately notify other contacts, or to send other types of notifications. As another example, the options button 106 may allow the user to activate alerts at the vehicle. For instance, the options button 106 may allow the user to activate the visual or audible alarm on the car-seat assembly 10 or on the vehicle. In some cases, the options button 106 may allow the user to deactivate further notifications or other actions, for example, when the smartphone user has reached the vehicle. The close button 107 can be selected by the user to close the notification 101. In some cases, if the user closes the notification 101, no further alerts are generated on the device 100.

In some example aspects of operation, a child is placed in the seat 11 and the belts 13 are secured about the child by fastening the latch 14 and the buckle 15. The pressure sensor 18 detects the presence of the child in the seat 11, and the latch sensor 19 detects that the latch 14 is fastened. Before the child is placed in the seat 11 (e.g., before or after the portable car-seat assembly 10 is installed in a vehicle) the parent or caretaker can specify a safe-temperature range that is stored in the memory of the portable car-seat assembly 10. For example, the safe-temperature range may be specified through the user interface 17. The user interface 17 may also display the current temperature detected by the temperature sensor 22 and the safe-temperature settings of the portable car-seat assembly 10. When the child is detected in the seat 11, the temperature sensor 22 monitors the ambient temperature about the portable car-seat assembly 10. In some instances, the solar receiver 20 and the charge stored on the internal battery of the portable car-seat assembly 10 allow the electronic components of the portable car-seat assembly 10 to operate for a long period of time (e.g., hours).

In some example aspects of operation, based on the temperature detected by the temperature sensor 22, the portable car-seat assembly 10 monitors for safe or unsafe passenger-conditions. If the temperature detected by the temperature sensor 22 falls outside the safe-temperature range, a series of events is initiated. A text message is sent to the parent's cell phone, indicating that a child is in the vehicle and the current temperature inside the vehicle needs attention for the safety of the child. After a five-minute or other time period has elapsed, the horn 23 and the strobe 21 are both activated to indicate an emergency status, and to allow parents or emergency first-responders to easily locate the vehicle. Then, a 911 emergency notification is sent to notify local authorities that a child is inside the vehicle and needs to be rescued. The messages sent to the parents and emergency personnel can indicate the location of the vehicle detected by a GPS unit in the portable car-seat assembly 10.

FIG. 2 is a schematic diagram of an example vehicle 200 that includes a seat assembly 204. In some examples, the vehicle 200 is a car, truck, van, or another type of passenger vehicle. The example vehicle 200 includes vehicle systems 202, which may include factory-installed systems, after-market-installed systems, portable systems, or other types of systems that are associated with the vehicle 200.

The example seat assembly 204 can be a portable car-seat assembly, a built-in seat assembly, or another type of seat assembly. In some examples, the seat assembly 204 is a portable car-seat assembly that can be installed in the vehicle 200 and removed from the vehicle 200 by operating (e.g., fastening or unfastening) latches, hooks, clasps, or belts associated with the seat assembly 204. For example, the seat assembly 204 can be the portable car-seat assembly 10 shown in figure FIG. 1A, or another type of portable car-seat assembly. In some examples, the seat assembly 204 is a built-in seat assembly of the vehicle 200. For example, the seat assembly 204 can be a driver seat, a front passenger seat, a rear passenger seat (e.g., a bench seat, a bucket seat, etc.), or another type of seat in a passenger vehicle.

In the example shown in FIG. 2, the vehicle systems 202 include a wireless communication system 210, a location detection system 212, passenger sensors 214, temperature sensors 216, a security system 218, and a climate control system 220. A vehicle can include additional or different vehicle systems, and the vehicle systems can operate in the manner described with respect to FIG. 2 or in another manner.

In some implementations, the vehicle systems 202 can be activated locally (e.g., by a passenger) inside the vehicle. In some implementations, some or all of the vehicle systems 202 can be activated remotely, for example, from a key fob, from a smartphone or other computing device, or another remote system. For example, the wireless communication system 210 may allow the security system 218, the climate control system 220, or other vehicle systems to communicate with a remote device through a BLUETOOTH® connection, a cellular data connection, or another type of communication link.

The wireless communication system 210 can be a cellular module or another type of component that communicates wirelessly with systems outside the vehicle 200. For example, the wireless communication system 210 can include one or more antennas, a transceiver, a signal processing unit, and other subsystems that are typically included in a cellular phone. As such, the wireless communication system 210 may be configured to communicate over a voice or data network, a satellite network, a Wi-Fi network, a BLUETOOTH® connection, or another type of network.

The location detection system 212 can be a Global Positioning System (GPS) unit or another type of location detection system. The location detection system 212 may be configured to triangulate a location and compute coordinates (e.g. latitude, longitude, altitude) corresponding to the vehicle's current location. In some cases, the location detection system 212 includes map data that can associate coordinates with physical addresses or location names.

The passenger sensors 214 can detect the presence of passengers in the vehicle's passenger seats. For example, the passenger sensors 214 may be included in or associated with the vehicle's built-in seats. In some instances, the passenger sensors 214 can detect whether a passenger is present in each individual seat in the vehicle. The vehicle 200 may also include a display or status indicator that indicates to the driver, based on information from the passenger sensors 214, when a passenger is detected in one or more of the passenger seats of the vehicle.

The temperature sensors 216 can detect the temperature inside the vehicle 200. In some cases, the temperature sensors 216 can also detect the external temperature outside the vehicle 200. The vehicle 200 may also include a display or status indicator that indicates to the driver, based on information from the temperature sensors 216, the internal temperature of the vehicle or the external temperature outside the vehicle.

The security system 218 can include an alarm system or another type of theft-deterrent system that secures the vehicle 200 against theft or break-ins. The security system 218 can include a siren or another type of audible alert system, a controller that can activate the vehicle's lights and horns, and sensors that detect unauthorized entry in the vehicle 200. A security system can include other types of features.

The climate control system 220 can include an air-conditioning system, a heating system, or a combination of these and other types of climate control systems. The climate control system 220 can include fans, vents and air ducts that circulate air in the interior of the vehicle. The climate control system 220 may also include cooling and heating systems that cool or heat the air that is communicated into the interior of the vehicle. The climate control system 220 may include an interface that allows a passenger to specify a temperature, fan speed, or other settings for the climate control system 220.

The example seat assembly 204 shown in FIG. 2 includes a seat and harness assembly 228, a wireless communication system 230, a location detection system 232, passenger sensors 234, temperature sensors 236, an alert system 238, a user interface 242, the battery system 244, a charge interface 246, a processor 248, and a memory 250. A seat assembly may include additional or different features, and the components of a seat assembly may operate as described with respect to FIG. 2 or they may operate in another manner. In some cases, two or more of the components shown in FIG. 2 are integrated into a single module or implemented as a single component. In some cases, an individual component shown in FIG. 2 can be implemented as multiple separate modules or components.

Some or all of the components of the example seat assembly 204 shown in FIG. 2 can be included in a built-in passenger seat within the vehicle 200. Some or all of the components of the example seat assembly 204 shown in FIG. 2 can be included in a portable car-seat assembly. For example, the car-seat assembly 10 shown in FIG. 1A may include some or all of the features of the seat assembly 204 shown in FIG. 2.

In some implementations, some or all of the components of the seat assembly 204 are integrated in the housing or base component of a portable car-seat assembly. For example, the wireless communication system 230, location detection system 232, the passenger sensors 234, the temperature sensors 236, the battery system 244, the processor 248, the memory 250, and possibly other components can be contained within the car seat housing and remain unseen during normal use. In some cases, the user interface 242 and the charge interface 246 are accessible to a user (e.g. on an external face of the car seat housing) when the seat assembly 204 is installed in the vehicle 200 for normal use.

The seat and harness assembly 228 support the passenger and secure the passenger in the vehicle 200. The seat and harness assembly 228 can be sized and configured for an adult, a child, an infant, or otherwise. The seat and harness assembly 228 shown in FIG. 2 can include the seat 11, the cover 16, the belts 13, the latch 14, the buckle 15, and possibly other components of the example portable car-seat assembly 10 shown in FIG. 1A. In some implementations, the belts, buckles, cover, and seat, are configured in another manner. The seat and harness assembly 228 shown in FIG. 2 can include a lap belt, a shoulder belt, or another type of built-in safety belt of the vehicle 200, and a bench seat, a bucket seat, or another type of built-in passenger seat of the vehicle 200.

The wireless communication system 230 can be a cellular module or another type of component that communicates wirelessly with systems outside the seat assembly 204. For example, the wireless communication system 230 can include one or more antennas, a transceiver, a signal processing unit, and other subsystems that are typically included in a cellular phone. As such, the wireless communication system 230 may be configured to communicate over a voice or data network, a satellite network, a Wi-Fi network, a BLUETOOTH® connection, or another type of network.

The location detection system 232 can be a Global Positioning System (GPS) unit or another type of location detection system. In some cases, the location detection system 232 is a GPS locator that is linked to the 911 emergency infrastructure. The location detection system 232 may be configured to triangulate location and compute coordinates (e.g. latitude, longitude, altitude) corresponding to the seat assembly's current location. In some cases, the location detection system 232 includes map data that can associate GPS coordinates with physical addresses or location names.

The passenger sensors 234 can detect the presence of passengers in the seat and harness assembly 228. For example, the passenger sensors 234 can include the latch sensor 19 or the pressure sensor 18 shown in FIG. 1A, or another type of passenger sensor can be used.

The temperatures sensors 236 can detect the temperature inside the vehicle 200 about the seat assembly 204. For example, the temperature sensors 236 can include the temperature sensor 22 shown in FIG. 1A, or another type of temperature sensor can be used. In some cases, the temperature sensors 236 included in the seat assembly 204 are positioned and configured to detect the ambient temperature experienced by a passenger in the seat and harness assembly 228.

The alert system 238 can generate audible or visual alerts. For example, the alert system 238 can include the strobe 21 and the horn 23 shown in FIG. 1A, a buzzer, a siren, or another type of alert system. In some implementations, the alert system 238 included in the seat assembly 204 is positioned and configured to attract attention outside the vehicle 200. For example, an audible alert system can generate an audible alert that indicates an emergency status, or a visual alert system can generate a visual alert that indicates an emergency status.

The user interface 242 can include a touchscreen, knobs, buttons, or other types of components that allow the user to provide input to the seat assembly 204. The user interface 242 can also include a digital display (e.g., LED, LCD, etc.) that provides output to the user. In some cases, the user interface 242 displays the temperature detected by the temperature sensors 236, the passenger status detected by the passenger sensors 234, or a combination of these and other types of information. In some cases, the user interface 242 indicates an operational status of the wireless communication system 230, location detection system 232, or other components. In some instances, the user interface 242 indicates the amount of charge in the battery system 244. The user interface 242 can be configured to display additional or different information in a variety of formats.

The battery system 244 and the charge interface 246 are components of a power system included in the seat assembly 204. The power system provides electrical energy that powers operation of the other components of the seat assembly 204. For example, the battery system 244 can provide a DC voltage that is consumed by the wireless communication system 230, location detection system 232, the passenger sensors 234, the temperature sensors 236, the alert system 238, the user interface 242, the processor 248, the memory 250, or a combination of these and other components. The charge interface 246 can include a solar receiver (e.g., the example solar receiver 20 shown in FIG. 1A), a wired connector that receives power from the vehicle 200 or another source, or a combination of these and other types of charge interfaces.

The processor 248 and the memory 250 can store and execute data and software that are used to operate components of the seat assembly 204. For example, the processor 248 or the memory 250 can receive passenger-status information (e.g. from the passenger sensors 234) and passenger-condition information (e.g., from the temperature sensors 236), and activate other components of the seat assembly 204 or the vehicle systems 202 in response to the received information.

The example processor 248 can be a data-processing apparatus that receives information from, and generates output to, the memory 250 or other components of the seat assembly 204. For example, the processor 248 can be a programmable microprocessor, a pre-programmed electronic controller, digital logic circuitry, or another type of data-processing apparatus.

The example memory 250 can store data received from the sensors, the user interface 242, and other components of the seat assembly 204. In some instances, one or more components of the seat assembly 204 retrieves information from the memory 250. The memory 250 can include, for example, a flash memory, a read-only memory, a random-access memory, or another type of computer-readable medium. In some implementations, the memory 250 stores software or other types of instructions that are executed by the processor 248. For example, in some cases, the memory 250 stores instructions associated with the safety-monitoring algorithm described with respect to FIG. 1A.

In some aspects of operation, a user specifies a safe-temperature range for the seat assembly 204 by entering numeric values in the user interface 242. For example, the user may specify a safe-temperature range of 50° F. to 80° F. When a passenger is detected in the seat and harness assembly 228 (by operation of the passenger sensors 234), temperature sensors 236 monitor the ambient temperature about the seat assembly 204 inside the vehicle 200. If the temperature falls outside a safe-temperature range while a passenger is detected in the seat and harness assembly 228, the processor 248 initiates a sequence of predetermined actions. For example, the processor 248 may initiate any of the actions described with respect to FIG. 1A or FIG. 3, or other types of actions.

In some aspects of operation, the processor 248 initiates actions by activating components of the seat assembly 204. For example, the processor 248 may generate visual or audible alerts by activating the alert system 238. As another example, the processor 248 may generate a notification or another type of message and initiate transmission of the message to a remote recipient by activating the wireless communication system 230. The recipient address or recipient identification can be received, for example, from the memory 250. The notification or message may include any of the information shown in the example notification 101 in FIG. 1B, or the message may include other information. To generate the message, the processor 248 may obtain location information from the location detection system 232 of the seat assembly 204, from the location detection system 212 of the vehicle 200, or both; and the processor 248 may obtain temperature information from the temperature sensors 236 of the seat assembly 204, from the temperature sensors 216 of the vehicle 200, or both.

In some aspects of operation, the processor 248 initiates actions by activating components of the vehicle systems 202. For example, the processor 248 may communicate with one or more of the vehicle systems 202 through the wireless communication systems 230, through a wired connection, or by another type of communication link. In some examples, the processor 248 generates visual or audible alerts by activating the security system 218, or the processor 248 initiates transmission of an emergency message to an external recipient by activating the wireless communication system 210.

In some implementations, the processor 248 initiates a remedial action within the vehicle 200 in response to detecting an occurrence of an unsafe passenger-condition, in response to detecting persistence of an unsafe passenger-condition, in response to a command received from a remote correspondent, or in response to another condition. For example, the processor 248 may cause the windows of the vehicle 200 to be rolled down, for example, if the external temperature outside the vehicle is less severe than the internal temperature inside the vehicle. As another example, the processor 248 may activate the climate control system 220 of the vehicle 200, for example, to cool or heat the interior of the vehicle 200.

In some implementations, the processor 248 initiates one or more of the described actions in response to a command received by the wireless communication system 230 from a remote recipient. For example, a remote message recipient may receive a notification through a smartphone application, and the smartphone application may allow the user to initiate an in-vehicle remedial action or an emergency first-responder notification.

In some instances, the vehicle 200 registers the presence a portable car-seat assembly and detects the presence of a passenger in the portable car-seat assembly. For example, the vehicle 200 may include a control (e.g., physical switch or knob, touchscreen, etc.) that allows a parent or vehicle operator to indicate that a portable car-seat assembly has been installed or that a child is present in the seat (or both), or the vehicle 200 may include sensors (e.g., Bluetooth, NFC, or other wireless sensors; pressure sensors; motion sensors; optical sensors; audio sensors; etc.) that detect installation of a portable car-seat assembly or passenger presence (or both). As another example, the vehicle 200 may detect the presence of a passenger based on a wearable device (e.g., bracelet, fob, etc.) worn by the passenger (e.g., the wearable device can wirelessly register with the vehicle 200 when the passenger enters the vehicle 200).

In some instances, the vehicle 200 has list of things it will do (or will not do) in response to detecting the presence of a portable car-seat assembly or the presence of a passenger in the portable car-seat assembly (or both). The list of actions can include, for example, cracking windows or sending notifications when the car is off (or when the driver seat is empty) and the internal or external temp outside a specified range.

Figure 3:
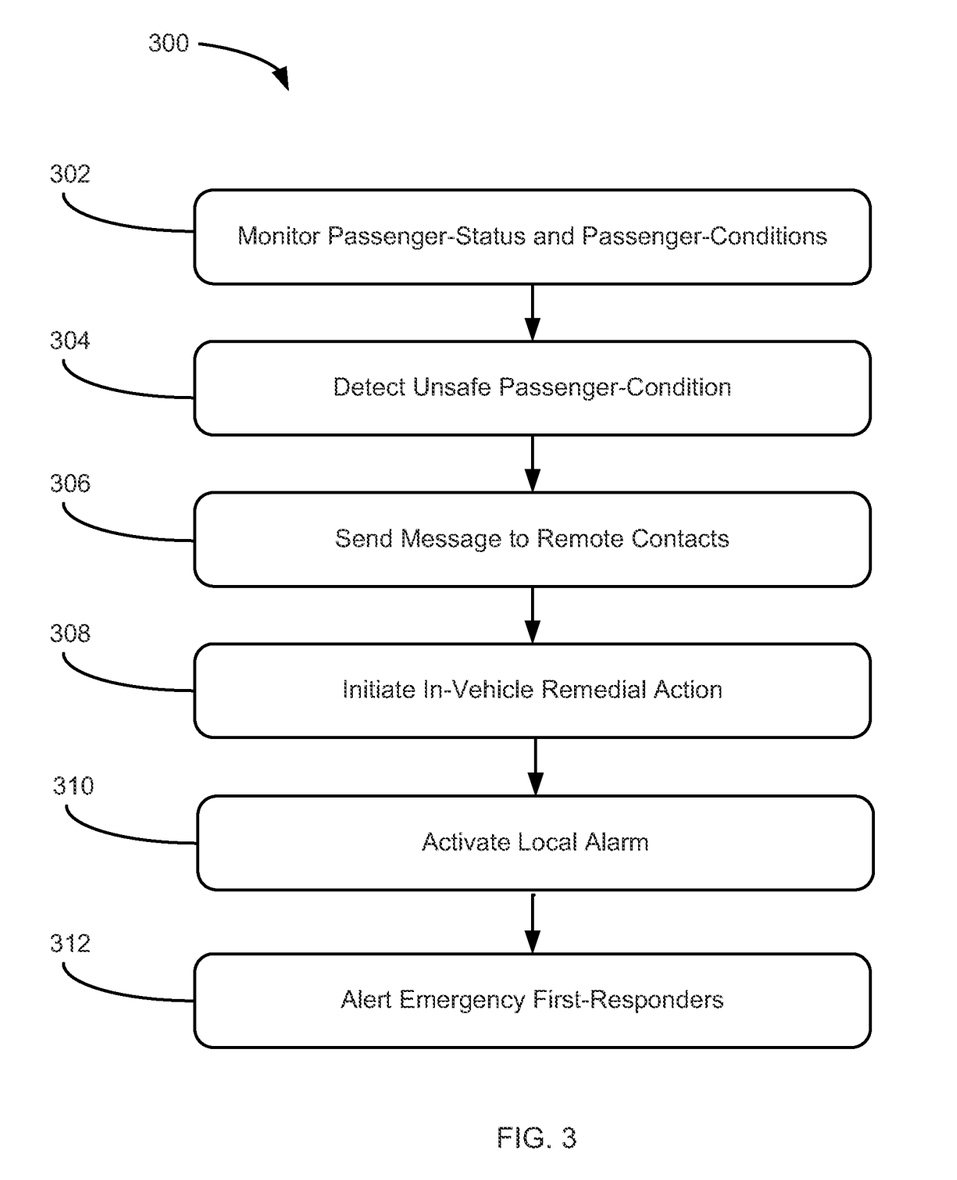
FIG. 3 is a flow chart showing an example process performed in a vehicle.

FIG. 3 is a flow chart showing an example process 300 performed in a vehicle. The example process 300 can be performed by components of a seat assembly within the vehicle, vehicle system components that are not part of the seat assembly, or a combination of these and other types of systems. For example, the example process 300 can be performed by components of the example vehicle systems 202 shown in FIG. 2, components of the example seat assembly 204 shown in FIG. 2, or a combination of them. As another example, the example process 300 or individual operations in the example process 300 can be performed by the example portable car-seat assembly 10 shown in FIG. 1A. The example process 300 can be performed by other types of systems and in other types of environments.

The example process 300 shown in FIG. 3 can include additional or different operations, and the operations can be performed in the order shown or in another order. In some cases, one or more of the operations is divided into multiple sub-operations, or multiple operations are combined into a single operation. In some instances, one or more of the operations in the example process 300 can be iterated or repeated, for example, until a terminating condition is reached.

In some implementations, the example process 300 is performed by a portable car-seat assembly that is designed for installation in a vehicle. A portable car-seat assembly, such as, for example, the portable car-seat assembly 10 shown in FIG. 1A, typically includes a seat adapted to support a passenger, and one or more belts or harnesses adapted to secure the passenger in a safe position in the seat. The portable car-seat assembly can be, for example, a child's booster seat, an infant car seat, or another type of portable seat assembly.

The portable car-seat assembly can include sensors and other hardware that can detect a passenger-status and passenger-conditions in or about the car-seat assembly. For example, the car-seat assembly can include a temperature sensor adapted to detect an ambient temperature about the car-seat assembly in the vehicle (e.g., the temperature sensors 236 in FIG. 2). The car-seat assembly can include a location detector adapted to detect a location of the car-seat assembly in the vehicle (e.g., the location detection system 232 in FIG. 2). The car-seat assembly can include a pressure sensor or a latch sensor adapted to detect a passenger in the seat (e.g., the pressure sensor 18 or the latch sensor 19 in FIG. 1A).

The portable car-seat assembly can include a data-processing apparatus and other hardware that process sensor data, for example, to detect unsafe passenger-conditions and initiate predetermined actions. For example, the portable car-seat assembly can include a visual alert system (e.g., a strobe), an audio alert system (e.g., a horn, siren, buzzer, etc.), a wireless communication module, a timer, and other types of alert and communication systems. The portable car-seat assembly can include a power system that powers the car-seat assembly components independent of the vehicle. For example, the portable car-seat assembly can include a rechargeable battery that provides electrical power to operate the sensors, the data-processing apparatus, and other hardware associated with the car-seat assembly. In some implementations, the portable car-seat assembly includes a solar receiver adapted to generate electrical energy based on solar energy (e.g., the solar receiver 20 in FIG. 1A).

In some implementations, one or more of the operations in the example process 300 are performed by vehicle system components that operate independent of a portable car-seat assembly. For example, the vehicle may include a passenger sensor that detects the presence of a passenger in the vehicle or in a particular seat, a temperature sensor that monitors the internal temperature of the vehicle, a location detector that detects the location of the vehicle, a processor or other data-processing apparatus that detects unsafe passenger-conditions and initiates predetermined actions in response, a communication system that wirelessly transmits messages to remote recipients, alert systems that generate visual or audible alerts, and other components that can perform one or more of the operations described.

At 302, the passenger-status and passenger-conditions are monitored by the seat assembly. For example, the passenger-status can be monitored based on sensor data from a pressure sensor that detects the presence of the passenger in the seat assembly, and the passenger-conditions can be monitored based on data from a temperature sensor that detects the temperature in the vehicle about the seat assembly. The passenger-status and passenger-conditions can be monitored by other types of sensors or in another manner. In some cases, the passenger-status or passenger-conditions, or both, are monitored continuously, periodically, at predetermined intervals, or in response to a specified condition.

In some examples, the passenger-status is a binary or other type of status value that indicates whether a passenger is present in a particular seat in a vehicle. For example, the passenger-status can be "passenger present" when a passenger is detected in the seat, or the passenger-status can be "passenger not present" when the passenger is not detected in the seat. In some cases, the passenger-conditions are monitored in response to a particular passenger-status, for example, only when a passenger is detected in the seat. In some examples, the passenger-conditions are a set of values that indicate environmental conditions detected about a particular seat in a vehicle. For example, the passenger-conditions can include a temperature detected in the vehicle, a time-rate of temperature change in the vehicle, and other information.

At 304, an occurrence of an unsafe passenger-condition is detected. For example, the occurrence of the unsafe passenger-condition can be detected based on the passenger-status and passenger-conditions monitored at 302. The occurrence of the unsafe passenger-condition can be detected by a processor or another type of data-processing apparatus carried by the seat assembly, or the occurrence of the unsafe passenger-condition can be detected by a component of the vehicle.

In some examples, the occurrence of the unsafe passenger-condition is detected when the ambient temperature inside the vehicle does not meet a predetermined safe-temperature-criterion and when a passenger is detected in the seat. The predetermined safe-temperature-criterion can include a lower threshold temperature, an upper threshold temperature, or both. For example, the seat assembly can include a user interface that allows a user to specify a range of safe temperatures (i.e., by indicating the upper and lower threshold values). In some examples, the unsafe passenger-condition is detected based on a set of conditions persisting over a period of time, for example, if the temperature inside the vehicle does not meet the predetermined safe-temperature-criterion while a passenger is detected in the seat for a period of 30 seconds, one minute, etc.

At 306, a message is sent to remote contacts. The message can indicate that an occurrence of the unsafe passenger-condition has been detected in the vehicle. The message can include information that allows the recipient to locate the vehicle and address the unsafe passenger-condition. For example, the message can include GPS coordinates, the physical address, or other location information detected by the seat assembly or by the vehicle before or after the unsafe passenger-condition was detected. As another example, the message can include the make, model and color of the vehicle, the license plate number of the vehicle, or a combination of these and other information.

In some implementations, the message is sent by a communication module included in the seat assembly. For example, the seat assembly may include a cellular communication module that wirelessly communicates with a cellular voice or data network. In some cases, the cellular communication module sends an email, a text message (i.e., an SMS message), a multimedia message (i.e., an MMS message), or another type of message. In some cases, the cellular communication module sends a message that is formatted for a particular mobile device application, for example, an application installed on a smartphone or tablet.

In some implementations, the message is generated by a processor or another type of data-processing apparatus included in the seat assembly. For example, the processor can obtain location data from a location detector, temperature data from a temperature sensor, and generate the message. The processor can then initiate transmission of the message to a remote recipient, for example, through a communication module. In some cases, the processor addresses the message to a particular recipient or set of recipients, for example, based on contact information stored in a memory included in the seat assembly. For instance, the processor can address the message to a particular phone number, a particular email address, or other address type. In some cases, the processor addresses the message to a remote server, and the remote server relays the message to a particular recipient or set of recipients. For example, the remote server can send a message to the message recipient or initiate alerts on the message recipient's mobile device through a client application running on the mobile device.

The message can be sent to multiple recipients or to a single recipient in multiple forms. For example, the processor or the remote server can access a database of contact information for users or owners of the car seat or vehicle; parents, guardians, relatives or caretakers of a particular child; or other types of contacts. The message can be sent to all types of contact information (e.g., email, text message, voice message) associated with a particular person on the list or all people on the list. In some cases, the message is first sent to a subset of the contacts, and if the unsafe passenger-condition persists for a period of time, the message is also sent to a second subset of the contacts. Here, a subset of the contacts can include a single contact or multiple contacts.

At 308, in-vehicle remedial action is initiated. In some cases, the in-vehicle remedial action is initiated by the processor or other data-processing apparatus included in the seat assembly, or the in-vehicle remedial action can be initiated by the vehicle itself. In some cases, the in-vehicle remedial action is initiated in response to a command from a remote correspondent. For example, the remote contact who received the message at 306 may respond to the message by remotely activating the in-vehicle remedial action. In some cases, the in-vehicle remedial action is initiated in response to the unsafe passenger-condition persisting for a predetermined amount of time (e.g., 5 minutes, 10 minutes, etc.), or another condition.

The in-vehicle remedial action can include operations performed in or by the vehicle to remedy the unsafe passenger-condition. For example, the in-vehicle remedial action can include rolling down one or more of the vehicle's windows, turning on the vehicle's climate control functions (e.g., air conditioner, heater, etc.), or other types of actions.

At 310, a local alarm is activated. In some cases, the local alarm is activated by the processor or other data-processing apparatus included in the seat assembly, or the local alarm is activated by the vehicle itself. The local alarm can be activated to alert people outside the vehicle to the unsafe passenger-condition inside the vehicle. In some cases, the local alarm can be activated to help the message recipient (i.e., the contact who received the message at 306) find the vehicle after receiving the message.

The local alarm can be activated in response to a command from a remote correspondence. For example, the remote contact who received the message at 306 may respond to the message by remotely invoking the local alarm system. In some cases, the local alarm is activated in response to the unsafe passenger-condition persisting for a predetermined amount of time (e.g., 5 minutes, 10 minutes, etc.), or another condition.

Activating the local alarm can include activating alert systems included in the seat assembly, alert systems included in the vehicle, or a combination of them. For example, activating the local alarm can include generating an audio alert that is audible outside the vehicle. The audio alert can be generated by the vehicle's horn, a siren included in the vehicle's alarm system, a horn or other audio alert system included in the seat assembly, or another type of audio alert system. As another example, activating the local alarm can include generating a visual alert that is visible outside the vehicle. The visual alert can be generated by the vehicle's exterior lights, a strobe or other visual alert system included in the seat assembly, or another type of visual alert system.

At 312, emergency first-responders are alerted. The emergency first-responders may be alerted, for example, through the 911 emergency system, or in another manner. In some cases, the emergency first-responders are alerted in the same manner that the remote contacts are alerted at 306. For example, emergency first-responders can be alerted by text message, voice message, or another type of message sent wirelessly from a wireless communication system included in the seat assembly or the vehicle.

In some cases, the alert to the emergency first-responders is initiated by the processor or other data-processing apparatus included in the seat assembly, or the alert to the emergency first-responders can be initiated by the vehicle itself. In some cases, the alert is initiated in response to a command from a remote correspondent. For example, the remote contact who received the message at 306 may respond to the message by remotely invoking an emergency alert function. In some cases, the alert is initiated in response to the unsafe passenger-condition persisting for a predetermined amount of time (e.g., 5 minutes, 10 minutes, etc.), or another condition.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus.

The term "data-processing apparatus" encompasses all kinds of apparatus, devices, and machines for processing data, including by way of example a programmable processor, a computer, a digital electronic controller, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

Some of the processes and logic flows described in this specification can be performed by one or more programmable processors executing logic or computer programs to perform actions by operating on input data and generating output. The processes and logic flows can also be performed by, and apparatus can also be implemented as, a digital electronic controller or special-purpose logic circuitry, e.g., an FPGA (field programmable gate array) or an ASIC (application specific integrated circuit). Processors suitable for the execution of a computer program include, by way of example, both general and special purpose microprocessors, and processors of any kind of digital computer.

Systems that include processors or other types of data-processing apparatus can typically interact through one or more communication links (e.g., a wired or wireless communication link, a communication network, etc.). Examples of a wireless communication link include a BLUETOOTH® link, a Near Field Communication (NFC) link, and an optical link. Examples of a communication network include a local area network ("LAN") and a wide area network ("WAN"), an inter-network (e.g., the Internet), a network comprising a satellite link, a cellular network, and a peer-to-peer network (e.g., an ad hoc peer-to-peer network). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple implementations separately or in any suitable sub-combination.

A number of implementations have been described. Nevertheless, it will be understood that various modifications can be made. Accordingly, other implementations are within the scope of the following claims.

What is claimed is:

1. A portable car-seat assembly for installation in a vehicle, the car-seat assembly comprising:
    a temperature sensor adapted to detect an ambient temperature about the car-seat assembly;
    a location detector adapted to detect a location of the car-seat assembly, wherein the location detector comprises a Global Positioning System (GPS) unit;
    a data-processing apparatus adapted to:
        detect an occurrence of an unsafe passenger-condition based on the ambient temperature detected by the temperature sensor; and
        in response to detecting an occurrence of the unsafe passenger-condition, initiate transmission of a message to a remote recipient, the message indicating the location detected by the location detector, the message includes a physical address associated with GPS coordinates detected by the GPS unit; and
    an electrical power system adapted to provide electrical power to the data-processing apparatus, the electrical power system including a solar receiver adapted to convert solar energy into electrical energy, the electrical energy providing primary power to the car-seat assembly and secondary power to a power source, the car-seat assembly and electrical power system are integrated into a self-contained unit.

2. The car-seat assembly of claim 1, comprising:
    a seat adapted to support a passenger; and
    a pressure sensor adapted to detect a passenger in the seat, wherein detecting the occurrence of the unsafe passenger-condition comprises detecting that:
        the ambient temperature does not meet a predetermined safe-temperature criterion, and
        a passenger is detected in the seat.

3. The car-seat assembly of claim 2, wherein the predetermined safe-temperature-criterion comprises the ambient temperature being above a lower threshold and below an upper threshold.

4. The car-seat assembly of claim 3, further comprising a user interface adapted to receive user input specifying the upper and lower thresholds.

5. The car-seat assembly of claim 1, wherein the data-processing apparatus is adapted to:
    initiate transmission of the message to a first remote recipient in response to detecting the occurrence of the unsafe passenger-condition; and
    initiate transmission of the message to a second, different remote recipient in response to detecting a persistence of the unsafe passenger-condition for a predetermined amount of time.

6. The car-seat assembly of claim 5, wherein the second remote recipient comprises an emergency first responder.

7. The car-seat assembly of claim 1, further comprising a visual alert system adapted to generate a visual alert that is visible outside the vehicle in response a detected occurrence of the unsafe passenger-condition, wherein the visual alert system comprises a strobe attached to the car-seat assembly.

8. The car-seat assembly of claim 1, further comprising an audio alert system adapted to generate an audio alert that is audible outside the vehicle in response to a detected occurrence of the unsafe passenger-condition.

9. The car-seat assembly of claim 1, wherein the message comprises a text message, and the car-seat assembly comprises a communication module adapted to send the message over a wireless communication network.

10. The car-seat assembly of claim 1, wherein the car-seat assembly comprises at least one of a child booster seat or an infant car seat.

11. A method performed in a vehicle comprising a portable car-seat assembly, the method comprising:
    identifying a remote recipient when the car-seat assembly is registered;
    monitoring temperature inside the vehicle;
    detecting an occurrence of an unsafe passenger-condition based on the temperature inside the vehicle; and
    in response to detecting the occurrence of the unsafe passenger-condition;
        detecting the location of the vehicle by operation of a Global Positioning System (GPS) unit,
        determining a physical address associated with GPS coordinates detected by the GPS unit, and
        initiating transmission of a message to the remote recipient, the message indicating a location of the vehicle and including the physical address associated with GPS coordinates detected by the GPS unit.

12. The method of claim 11, wherein detecting the occurrence of the unsafe passenger-condition comprises detecting that:
the temperature inside the vehicle does not meet a predetermined safe-temperature-criterion; and
a passenger is detected in the seat of a portable car-seat assembly inside the vehicle.

13. The method of claim 11, comprising:
initiating transmission of the message to a first remote recipient in response to detecting the occurrence of the unsafe passenger-condition; and
initiating transmission of the message to an emergency first responder in response to detecting a persistence of the unsafe passenger-condition for a predetermined amount of time.

14. The method of claim 11, further comprising generating at least one of:
a visual alert that is visible outside the vehicle in response a detected occurrence of the unsafe passenger-condition, wherein the visual alert comprises light from a strobe; or
an audio alert that is audible outside the vehicle in response to a detected occurrence of the unsafe passenger-condition.

15. The method of claim 11, wherein the message comprises a text message, and the method comprises sending the text message over a wireless communication network.

16. The method of claim 11, wherein identifying the remote recipient further comprises identifying a smartphone and setting a safe temperature range for the car seat assembly.

17. A passenger vehicle comprising:
a temperature sensor adapted to detect an ambient temperature about a passenger seat assembly in a vehicle;
a location detector adapted to detect a location of the vehicle, wherein the location detector comprises a Global Positioning System (GPS) unit;
a data-processing apparatus adapted to:
detect an occurrence of an unsafe passenger-condition based on the ambient temperature detected by the temperature sensor; and
in response to detecting an occurrence of the unsafe passenger-condition, initiate transmission of a message to a remote recipient, the message indicating the location detected by the location detector, the message includes a physical address associated with GPS coordinates detected by the GPS unit; and
an electrical power system adapted to provide electrical power to the data-processing apparatus, the electrical power system including a solar receiver adapted to convert solar energy into electrical energy, the electrical energy providing primary power to the passenger seat assembly and secondary power to a power source, the passenger car seat assembly and electrical power system are integrated into a self-contained unit.

18. The car-seat assembly of claim 17, wherein the physical address comprises a street address and a distance of the car-seat assembly from the street address.

19. The car-seat assembly of claim 17, wherein the car-seat assembly comprises a seat and a fabric cover that covers the car seat, and wherein the solar receiver is woven into a fabric of the fabric cover.

20. The car-seat assembly of claim 17, further comprising:
a pressure sensor adapted to detect a passenger in the passenger seat assembly, wherein the pressure sensor is a pressure plate and wherein detecting the occurrence of the unsafe passenger-condition comprises detecting that:
the ambient temperature does not meet a predetermined safe-temperature-criterion, and
a passenger is detected in the passenger seat assembly; and
a visual alert system adapted to generate a visual alert that is visible outside the vehicle in response a detected occurrence of the unsafe passenger-condition, wherein the visual alert system comprises a strobe attached to the car-seat assembly.

* * * * *